US011010267B2

(12) United States Patent
Neall et al.

(10) Patent No.: US 11,010,267 B2
(45) Date of Patent: May 18, 2021

(54) METHOD AND SYSTEM FOR AUTOMATIC MAINTENANCE OF STANDBY DATABASES FOR NON-LOGGED WORKLOADS

(71) Applicant: ORACLE INTERNATIONAL CORPORATION, Redwood Shores, CA (US)

(72) Inventors: Ian Stuart Neall, Kingwood (GB); Yunrui Li, Fremont, CA (US); Steven J. Mcgee, Bedford, NH (US); Yi Ding, Redwood City, CA (US); German Shegalov, San Francisco, CA (US); Shanshan Song, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 614 days.

(21) Appl. No.: 15/828,146

(22) Filed: Nov. 30, 2017

(65) Prior Publication Data

US 2019/0095297 A1   Mar. 28, 2019

Related U.S. Application Data

(60) Provisional application No. 62/562,319, filed on Sep. 22, 2017.

(51) Int. Cl.
*G06F 11/20* (2006.01)
*G06F 11/14* (2006.01)
(Continued)

(52) U.S. Cl.
CPC ...... *G06F 11/2097* (2013.01); *G06F 11/1471* (2013.01); *G06F 11/2023* (2013.01);
(Continued)

(58) Field of Classification Search
CPC ............ G06F 11/2097; G06F 11/2048; G06F 11/2038; G06F 11/2069; G06F 11/1471;
(Continued)

(56) References Cited

U.S. PATENT DOCUMENTS 5,832,516 A * 11/1998 Bamford ................. G06F 16/00
6,658,589 B1 * 12/2003 Taylor ................. G06F 11/1458
707/999.202

(Continued)

OTHER PUBLICATIONS

Schupmann et al. (Oracle® Data Guard Concepts and Administration, lOg Release 1 (10.1). Dec. 2003. Oracle Corporation. Year: 2003).*

(Continued)

*Primary Examiner* — James E Richardson
(74) *Attorney, Agent, or Firm* — Vista IP Law Group, LLP

(57) ABSTRACT

A computer program product, system, and computer implemented method for automatic maintenance of standby databases for non-logged workloads, the process comprising: maintaining a redo stream of redo records sent from a primary database to a standby database, identifying a change made at the primary database for which a redo record was not created, inserting a placeholder redo record into the redo stream corresponding to the change identified at the primary database for which the redo record was not created, sending, to the standby database, a copy of one or more data blocks corresponding to the change that is associated with the placeholder redo record, receiving the placeholder redo record from the redo stream, identifying the copy of the one (Continued)

or more data blocks sent from the primary database corresponding to the placeholder redo record, and applying the copy of one or more data blocks to update the standby database.

40 Claims, 11 Drawing Sheets

(51) Int. Cl.
  *G06F 16/23* (2019.01)
  *G06F 16/27* (2019.01)
(52) U.S. Cl.
  CPC ...... *G06F 11/2038* (2013.01); *G06F 11/2048* (2013.01); *G06F 11/2069* (2013.01); *G06F 11/2076* (2013.01); *G06F 11/2082* (2013.01); *G06F 16/23* (2019.01); *G06F 16/2358* (2019.01); *G06F 16/27* (2019.01); *G06F 2201/80* (2013.01); *G06F 2201/82* (2013.01)
(58) Field of Classification Search
  CPC ............. G06F 11/2082; G06F 11/2023; G06F 11/2076; G06F 2201/80; G06F 2201/82; G06F 16/23; G06F 16/2358; G06F 16/27
  See application file for complete search history.

(56) References Cited

U.S. PATENT DOCUMENTS

| | | | | |
|---|---|---|---|---|
| 7,627,614 | B2* | 12/2009 | Hu | G06F 11/1471 |
| 2006/0200497 | A1* | 9/2006 | Hu | G06F 11/1471 |
| 2008/0022059 | A1* | 1/2008 | Zimmerer | G06F 11/1662 |
| | | | | 711/162 |
| 2008/0235294 | A1* | 9/2008 | Girkar | G06F 11/2076 |
| 2012/0054533 | A1* | 3/2012 | Shi | G06F 11/2097 |
| | | | | 714/4.1 |
| 2012/0323849 | A1* | 12/2012 | Garin, Jr. | G06F 16/27 |
| | | | | 707/617 |
| 2016/0179867 | A1* | 6/2016 | Li | G06F 11/1471 |
| | | | | 707/634 |

OTHER PUBLICATIONS

Oracle, "Best Practices for Synchronous Redo Transport: Data Guard and Active Data Guard", Oracle White Paper, (Mar. 2015).
Oracle, "Oracle Active Data Guard Far Sync Zero Data Loss at Any Distance: Oracle Maximum Availability Architecture Best Practices", Oracle White Paper, (Aug. 2014).
Davis, T. et al., "SQL Server Transaction Log Management", Stairways handbook, Simple Talk Publishing, (Oct. 2012).
King, R. et al. "Management of a Remote Backup Copy for Disaster Recovery", ACM Transactions on Database Systems, vol. 16, No. 2, (Jun. 1991).
IBM, "Data Recovery and High Availability Guide and Reference", DB2, Version 9 Release 7, (Updated Jul. 2012).
Altibase, "Replication Manual: Release 6.3.1", Altibase Corporation, (Mar. 13, 2015).
VMware, "Microsoft SQL Server on VMware vSphere: Availability and Recovery Options", Version 1.0, (May 2016).
Levandoski, J. J. et al., "Deuteronomy: Transaction Support for Cloud Data", *5th Biennial Conference on Innovative Data Systems Research (CIDR)*, (Jan. 12, 2011).
Oracle, "Oracle Active Data Guard: Real-Time Data Protection and Availability", Oracle White Paper, (Dec. 2014).
Els, A., "The Synchronize Standby Database Option", Dbvisit Standby 8.0 User Guide, (Last updated on Sep. 21, 2018).

* cited by examiner

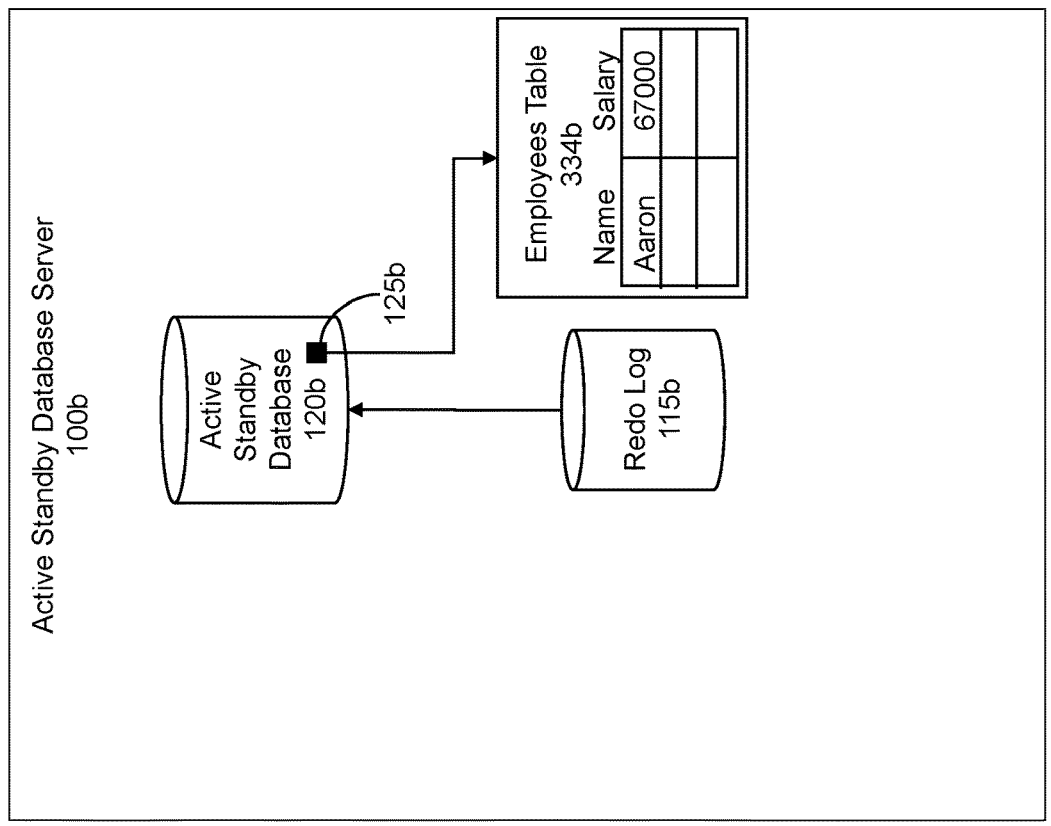
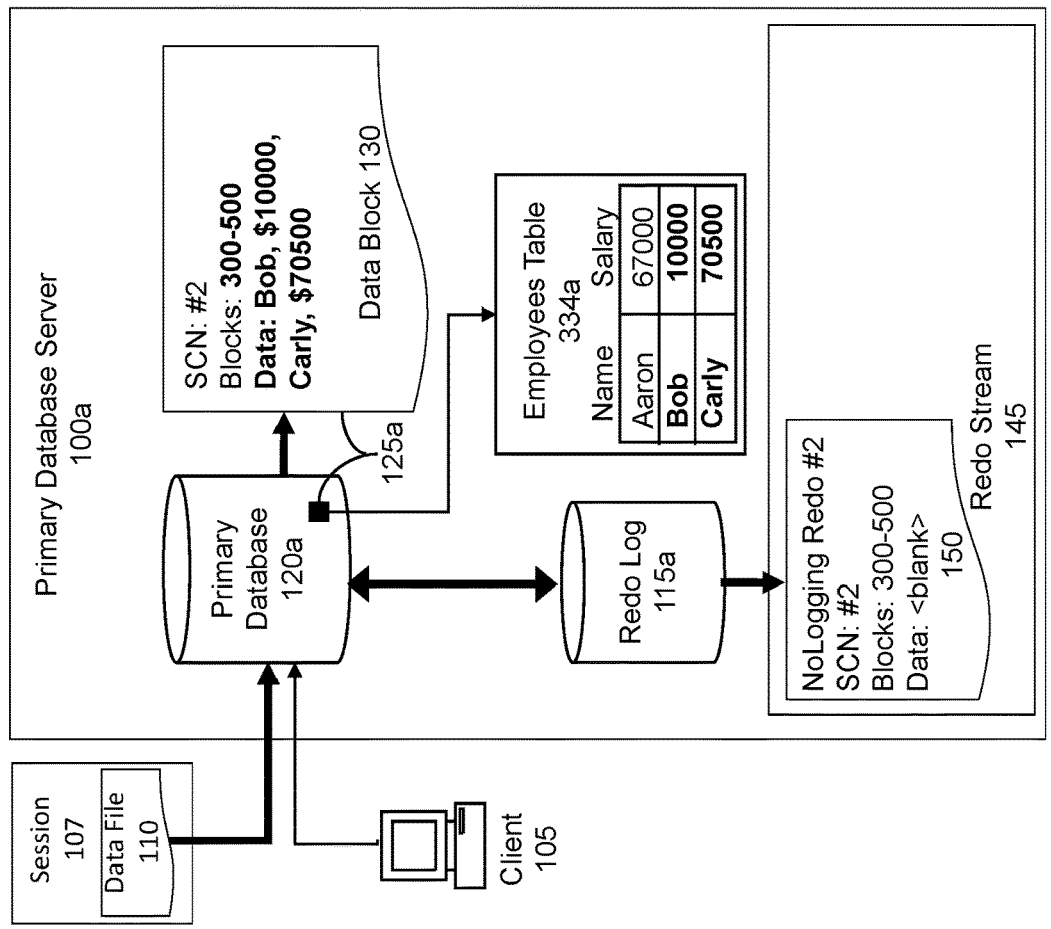
FIG. 4A

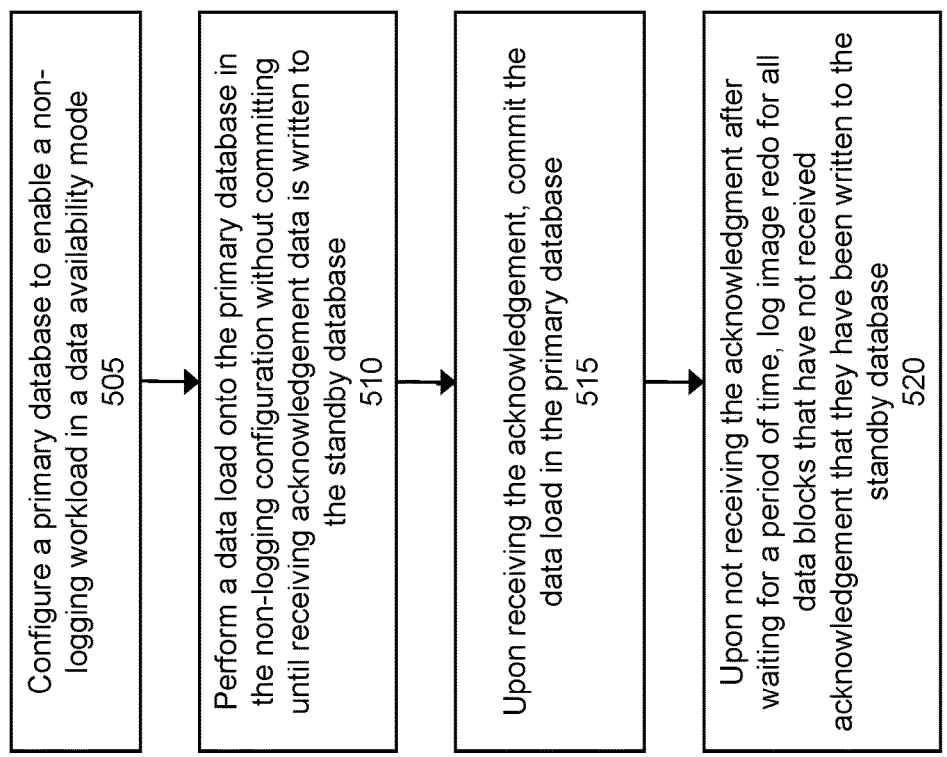
FIG. 5 – Data Availability

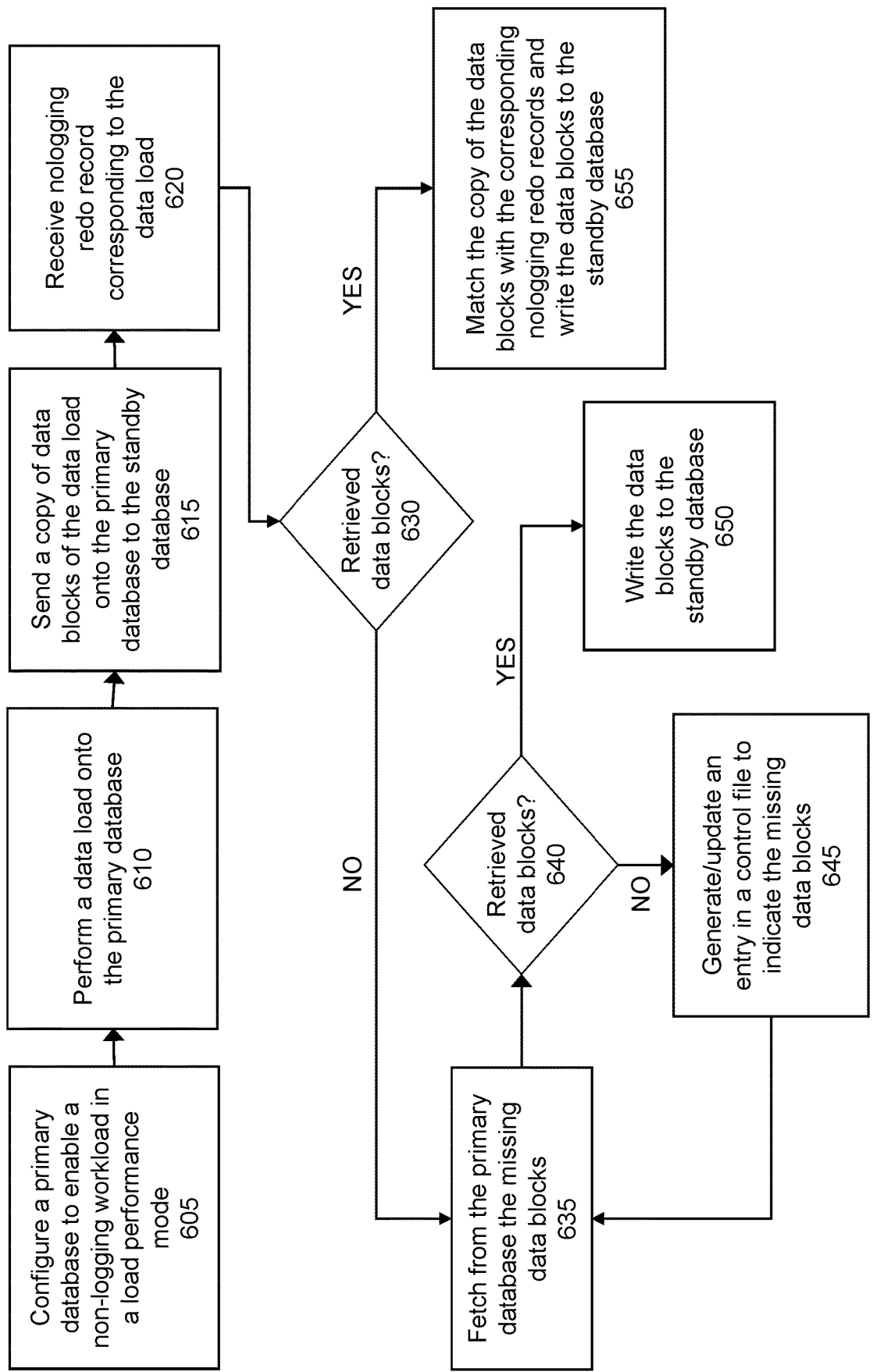
FIG. 6 – Load Performance

METHOD AND SYSTEM FOR AUTOMATIC MAINTENANCE OF STANDBY DATABASES FOR NON-LOGGED WORKLOADS

CROSS-REFERENCE TO RELATED APPLICATION(S)

This application claims priority to U.S. Provisional Application Ser. No. 62/562,319, entitled "METHOD AND SYSTEM FOR AUTOMATIC MAINTENANCE OF STANDBY DATABASES FOR NON-LOGGED WORKLOADS", filed Sep. 22, 2017.

FIELD

This disclosure concerns a method, a computer program product, and a computer system for automatic maintenance of standby databases for non-logged workloads.

BACKGROUND

A standby database is a database replica a primary database. Standby databases may be created to protect against disasters, data corruption, and/or supplemental reporting. For example, if a primary database is destroyed or if data stored in the primary database is corrupted, a failover may be performed such that a standby database becomes the new primary database. As another example, many reporting applications execute on standby databases to offload computer processing from the primary since the data between the standby and the primary are generally synchronized. Some of these reporting applications require the data on the standby to be as close to or as near identical to the primary as possible.

Typically, a standby database is maintained by applying redo logs from the primary database to the standby database. At the standby, the received copies of redo logs are used to reconstruct changes made to the contents of the primary database, e.g., where information maintained in the redo log is sent to the standby database and applied to its contents. For example, when redo records are generated in response to logged changes made to the contents of a primary database, these records are sent to a standby database where the same changes are made to ensure that the contents of the standby database remain identical to those of the primary database.

However, there are circumstances where the standby database is not continuously kept in synch with the primary database. This is because there may be numerous costs associated with the synchronization process, including for example, overhead to perform redo generation/writing, redo archiving, redo transport on the primary, and/or latency costs for wait times for confirmation of synch completion at the standby. Depending on the type of workload performed on the primary, adding this additional overhead for the synch process may create significant performance problems at the primary. Therefore, some systems are configured to allow logging to be turned off at the primary for a variety of reasons including costs associated with the synchronization process even though a standby is implemented. This may result in the standby not being synchronized with the primary.

The problem is there are some downstream applications that may rely on the fact that the standby database is continuously kept in synchronization with the primary database. For example, there may be reporting applications that require the data on the standby database to be as close to or as near identical to the primary database as possible. As another example, if the primary database is destroyed or if data stored in the primary database is corrupted, the standby database may become the new primary database. If the standby is not synchronized with the primary, then there may be data inconsistency problems when the standby database becomes the new primary database.

Therefore, there is a need for an improved approach to implement a primary database and standby database that addresses the above-described problems.

SUMMARY

Embodiments of the present disclosure provide a computer program product, a computer system, and a computer implemented method for automatic maintenance of standby databases for non-logged workloads, comprising at a primary database, performing: maintaining a redo stream of redo records sent from a primary database to a standby database, identifying a change made at the primary database for which a redo record was not created, inserting a placeholder redo record into the redo stream corresponding to the change identified at the primary database for which the redo record was not created, sending, to the standby database, a copy of one or more data blocks corresponding to the change that is associated with the placeholder redo record, at the standby database, performing: receiving the placeholder redo record from the redo stream, identifying the copy of the one or more data blocks sent from the primary database corresponding to the placeholder redo record, and applying the copy of one or more data blocks to update the standby database.

Further details of aspects, objects and advantages of the disclosure are described below in the detailed description, drawings and claims. Both the foregoing general description and the following detailed description are exemplary and explanatory, and are not intended to be limiting as to the scope of the disclosure.

BRIEF DESCRIPTION OF THE DRAWINGS

The drawings illustrate the design and utility of embodiments of the present disclosure, in which similar elements are referred to by common reference numerals. In order to better appreciate the advantages and objects of embodiments of the disclosure, reference should be made to the accompanying drawings. However, the drawings depict only certain embodiments of the disclosure, and should not be taken as limiting the scope of the disclosure.

The drawings use like reference numerals to identify like elements. A letter after a reference numeral, such as "120*a*," indicates that the text refers specifically to the element having that particular reference numeral. A reference numeral in the text without a following letter, such as "120," refers to any or all of the elements in the drawings bearing that reference numeral (e.g. "120" in the text refers to reference numerals "120*a*" and/or "120*b*" in the drawings).

FIGS. 4A-4B illustrate an example of an automatic maintenance of standby databases for non-logged workloads, according to some embodiments of the disclosure.

FIG. 5 is a flow chart for an automatic maintenance of standby databases for non-logged workloads running in a Data Availability mode, according to some embodiments of the disclosure.

FIG. 6 is a flow chart for an automatic maintenance of standby databases for non-logged workloads running in a Load Performance mode, according to some embodiments of the disclosure.

DETAILED DESCRIPTION OF THE EMBODIMENTS OF THE DISCLOSURE

The present disclosure provides an improved approach for automatic maintenance of standby databases for non-logged workloads.

Various embodiments are described hereinafter with reference to the figures. It should be noted that the figures are not necessarily drawn to scale. It should also be noted that the figures are only intended to facilitate the description of the embodiments, and are not intended as an exhaustive description of the disclosure or as a limitation on the scope of the disclosure. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, references, throughout this specification, to "some embodiments" or "other embodiments" suggests that a particular feature, structure, material, or characteristic described in connection with the embodiments is included in at least one embodiment. Thus, the appearances of the phrase "in some embodiments" or "in other embodiments," in various places throughout this specification are not necessarily referring to the same embodiment or embodiments.

Due to the reality of non-logged operations, the main mechanism by which the standby is normally maintained (e.g., apply redo logs) is lost because of the non-logging mode. Some options that were used in legacy systems is to not use a non-logging operation or if a non-logged operation is used, occasionally or periodically update the standby with a full copy of the primary using, for example, a snapshot copy of the primary, which involves copying much more data than is necessary. Neither options are particularly good options.

Embodiments of the disclosure address these problems by continuously maintaining the synchronization of data between the standby database and the primary database—even if logging is turned off at the primary database. Instead of not generating any redo logs at all when logging is turned off for a workload, the primary database will instead generate lightweight, placeholder redo records corresponding to the non-logged operations, where the placeholder redo records are inserted into the stream of redo records sent to the standby database. In parallel, the primary database will also send copies of data blocks of the changed data blocks that correspond to the placeholder redo records. The standby database, after receiving the placeholder redo records from the primary database via the redo stream, will search for the copies of the data blocks corresponding to the placeholder redo records and apply the copies of the data blocks to the standby database. Therefore, non-logged workloads at the primary database may be automatically maintained at the standby database.

Figure 1:
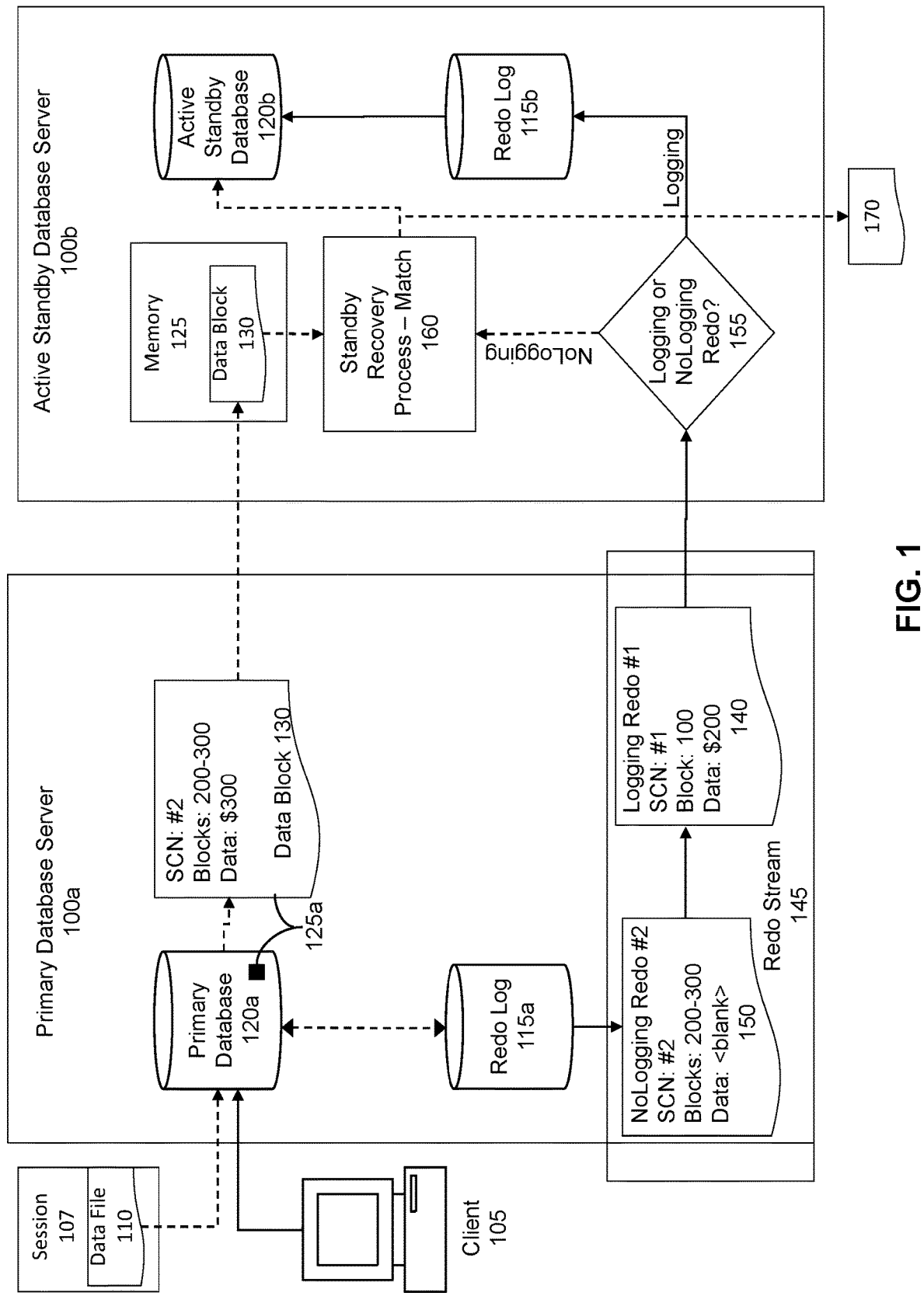
FIG. 1 illustrates a database system in which some embodiments of the disclosure are implemented.

FIG. 1 illustrates a database system in which some embodiments of the disclosure are implemented. Please note, with respect to FIG. 1, solid connector lines with arrows illustrate a normal redo log processing for logged operations. Whereas dotted connector lines with arrows illustrate an improved approach for automatic maintenance of standby databases for non-logged workloads, according to some embodiments of the disclosure.

For illustrative purposes, FIG. 1 shows a database system including a primary database server 100*a* on which a primary database 120*a* resides, an active standby database server 100*b* on which an active standby database 120*b* resides, and a client 105. However, in various embodiments, a database system may include more or fewer database servers 100, databases 120, sessions 107, clients 105, nologging/placeholder redo records 150, logging redo records 140, data blocks 130, memory 125, and control files 170 than depicted in FIG. 1. Furthermore, in some embodiments, conventional components of database servers 100, sessions 107 and/or clients 105, such as compilers, SQL engines, API layers, and the like are not shown so as to not obscure the components of the database system to be discussed with regard to FIG. 1.

As shown in FIG. 1, a database system may include several database servers 100*a-b*, sessions 107 and clients 105. The primary database server 100*a* manages data stored in the primary database 120*a* while the active standby database server 100*b* manages data stored in the active standby database 120*b*. The active standby database 120*b* has read-only functionality and is a synchronized physical replica of the primary database 120*a*, such that its contents are intended to be identical to the contents of the primary database 120*a* on a block-for-block basis. The contents of the primary database 120*a* and the active standby database 120*b* may include various types of data that is stored in one or more physical datafiles. For example, data may be organized into tables and indexes, which are physically stored in datafiles as data blocks in the primary database 120*a* and in the active standby database 120*b*. The client 105 is connected to the primary database 120*a* via database sessions or "sessions."

Client 105 may be a client application where one or more users may access and manipulate data stored in the database 120*a*. Session 107 is a database session or "sessions" that may be connected to the primary database for processing/loading data files such as data file 110. Session 107 may be any database session that allows a process, a computer program, an executable, etc. to interact with a database. Session 107 may be used by bulk data loading programs, direct loads or batch uploads, etc.

In some embodiments, each database server 100*a-b* includes a redo log 115*a-b*, which stores a collection of redo records. The redo records describe changes to data stored in the databases 120*a-b*. The redo records are generated when these changes are made in the primary database 120*a*. For example, if a table storing salaries for multiple employees is stored in a database 120 is updated, redo records are generated that describe how the data blocks for the table were changed. Thus, redo records allow changes made to the contents of a database 120 to be reconstructed on a blockby-block perspective. In some embodiments, to provide protection against failures involving the redo logs 115a-b, multiple copies of the redo logs 115a-b may be maintained for each database 120a-b (e.g., on different disks). In some embodiments, the standby and the primary are using physical replication that has exactly the same disk/block layouts for the database structures. In other embodiments, the standby and the primary may not have exactly the same disk/block layouts. However, the data blocks sent by the primary to the standby may be analyzed to identify where and how the sent data blocks may be applied to the standby.

As illustrated in FIG. 1, redo records stored in the redo log 115a at the primary database server 100a may be sent to via redo stream 145 to the standby database server 100b. Redo stream 145 is a redo transport service that transfers redo records to a downstream database. The redo records may be stored in a redo log 115b at the active standby database server 100b. Once these records are received at the active standby database server 100b, any changes made to the contents of the primary database 120a also may be made to the contents of the active standby database 120b by a standby recovery process 160. For example, when data is changed in a database table in database 120a, one or more redo records describing this change may be created and stored in the redo log 115a at the primary database server 100a. In this example, these records also may be sent to the active standby database server 100b via the redo stream 145 where they may be stored in the redo log 115b at the active standby database server 100b and the changes described in the redo records may be applied to the contents of the active standby database 120b. By applying the changes described by the redo records to the contents of the active standby database 120b, the contents of the active standby database 120b remain identical to the contents of the primary database 120a.

To illustrate an example of how the database system supports data consistency on the active standby database 120b after receiving an update from client 105 to the primary database 120a, suppose a connection is established between the client 105 and the primary database 120a, as illustrated in FIG. 1. Upon establishment of the connection, client 105 may update a record in an Employees table to change a value from $100 to $200. Since the database systems 100a/100b are implemented with a high availability, data protection and disaster recovery solution for enterprise data (e.g., Oracle Active Data Guard), operations executed on the primary database server 100a to change data in the primary database 120a will generate a redo log containing one or more redo records to be applied at a standby database server 100b. Here, client 105 is making a change to a record on an Employees table. One or more logging redo records (e.g., logging redo record 140) describing this change may be generated and stored in the redo log 115a at the primary database server 100a. As also described above, these records may be sent to the active standby database server 100b via redo stream 145, where the redo record(s) may be stored in the redo log 115b and the same change may be applied to the contents of the active standby database 120b, based on the information contained within the redo records. Redo records for a logged change may only ever be for 1 data block.

Redo record 140 may comprise a unique redo record identifier (e.g., "1"), a redo record type (e.g., "logging", "nologging", etc.), a system change number (SCN) (e.g., "1"), the block number that is changed (e.g., block 100), and the actual copy of the block having the data (e.g., $200). The unique redo record identifier is a unique identifier to uniquely identify a redo record. The redo record type indicates the type of redo record, for example, a standard redo record may be designated as a logging redo record and a non-logged redo record (e.g., a placeholder redo record) may be designated as a nologging/placeholder redo record. Both types of redo records contain metadata describing the redo record (e.g., redo record 140 includes Logging Redo #1, SCN=#1, Block=100, etc.).

One difference between a logging redo record and a nologging/placeholder redo record is whether or not the actual data that was changed in the data block in the primary database 120a is present in the redo record. A nologging redo log (e.g., placeholder redo log) does not contain data that was inserted in the primary database. This is because in a non-logged operation, the primary database sends a copy of the data blocks that were loaded in the primary database to the standby database via the network instead of writing the data blocks into the normal redo logs to be transported to the standby database in the normal redo stream. Instead, a placeholder redo record may contain identifiers indicating one or more blocks, and in many cases, pertaining to a range of data blocks that were changed as a result of the non-logged operation. This way, the additional burden of redo processing of the non-logged operation is not incurred, which may significantly add additional processing burden on the primary database server 100a and primary database 120a to manage the redo processing. For example, in a regular logging mode, the additional burden may include durably storing the redo logs containing the data in the primary and standby. In particular, in a regular logging mode, the redo processing may have to write/apply the data that was inserted into the primary database to the redo log 115a, then the redo records are transported to the standby database to be written into the redo log 115b, and then the redo records are written/applied into the standby database. However, in the present embodiment, the additional burden of durably storing the redo logs to a redo log 115a and a redo log 115b are avoided because the nologging/placeholder redo log does not contain the data blocks. Instead, a copy of the data blocks is sent to a volatile memory location at the standby database where it waits to be applied/written to the standby database. Furthermore, when the placeholder redo record indicates a range of data blocks corresponding to a copy of the data blocks loaded by the non-logged operation, this may further improve the processing at the primary database because in the case the range of data blocks is for 100 data blocks, as an example, there is a saving of 99 redo records that would have need to be written when running in a logged mode that does not need to be written under the non-logged mode. The examples of FIG. 1 and the remaining FIGs. may depict only one logging redo record 140 and one nologging/placeholder redo record 150 for ease of explanation. One of ordinary skill in the art may appreciate in a typical data load, multiple redo records are generated and are transported via the redo stream 145.

In one embodiment, another difference between a logging redo record and a nologging/placeholder redo record is that a non-logged record may only represent an INSERT of data, not an UPDATE or DELETE, whereas a logged operation/workload may represent an INSERT, UPDATE or DELETE of data. In alternate embodiments, non-logged records may represent any of INSERT, UPDATE, or DELETE operations.

When logging is turned on, the redo record will include all of the contents of ordinary redo records, such as a copy of the data block that includes at least the changed data. For example, redo record 140 shows a copy of the data block 100 as $200. In contrast, when logging is turned off, the redo record will be "lightweight", and will correspond to a placeholder that includes enough information to indicate to the standby the fact that a non-logged change has occurred and for the standby to identify the specific block(s) that should be acquired to keep the standby in synch for this change. Thus, when logging is turned off, the nologging/placeholder redo record will not contain the actual data. For example, nologging redo record 150 shows the range of data blocks 200-300 is blank. Instead, a copy of the data blocks corresponding to the non-logged operation is sent to the standby database rather than written to the redo records to be sent via the redo stream. Nologging/placeholder redo record 150 will be further discussed below in relation to loading data in the non-logged configuration such that a copy of the actual data blocks corresponding to the data file 110 loaded into the primary database 120*a* is sent directly to the active standby database server 100*b* as data block 130.

In some embodiments, redo record 140 contains all of the necessary information an active standby database server 100*b* would need to apply the redo record to the active standby database 120*b*, including the actual data for block 100. The SCN is the database's logical timestamp to indicate when certain activities have taken place in the database.

The SCN marks a consistent point in time in the database. The SCN is used to represent the time the operation (when the value changed from $100→$200) occurred in the primary database for version and state management purposes of the data. For ease of explanation, the SCN is depicted in this disclosure as having a value of #1, #2, etc. However, one of ordinary skill in the art may appreciate the SCN may be represented in a different format during implementation (e.g., a timestamp value). The block number containing at least the changed data indicates the particular block within the database files that is changed. The copy of data block 100 is used by the standby recovery process 160 within the active standby database server 100*b* to apply the data to the active standby database 120*b* to keep the active standby database 120*b* in sync with the primary database 120*a*.

The improved approach for automatic maintenance of standby databases for non-logged workloads will now be disclosed. In some embodiments, a session 107 may perform a direct load of data file 110 into primary database 120*a*. Data file 110 may be any medium that contains data that will be loaded into a storage device. For example data file 110 may be a text file, another database, a transitory medium containing data that is constantly streaming in and out of the transitory medium, etc.

Session 107 may configure the primary database to turn off logging so that the data file 110 may be loaded onto the primary database 120*a* via session 107 in a non-logged mode. Compared to the logging mode on the primary database server 100*a*, the non-logged mode generates negligible redo information because operating in the non-logged mode, placeholder redo logs are written/generated/created without including the actual data in the redo logs. Instead, data block(s) 125*a* that are changed as a result of the data loaded onto the primary database are copied to network socket buffers as data block(s) 130 and are sent directly to the active standby database server 100*b* to be applied into the active standby database 120*b*, the data block(s) 130 corresponding to the respective redo logs that are generated as a result of the data loaded under the non-logged mode.

For example, in the non-logged mode, the extra overhead of inserting of the actual data loaded onto the primary database is not included in the generation of the redo logs. This eliminates the overhead of generating extra operations required to include the actual data loaded into the redo logs itself, which therefore reduces the amount of computer processing and storage space required to include the actual data into the redo logs. Instead, the range of data blocks loaded is sent separately to the standby database server 100*b* as data block(s) 130. Data block(s) 130 is also referenced and/or otherwise identified/identifiable in the nologging redo records 150 (e.g., placeholder redo records). Nologging redo records 150 are sent to the standby database server 100*b* via the redo log transport mechanism (e.g., redo stream 145), while the copy of the data blocks containing the data are sent separately to the standby database server 100*b* as data block 130 at maximum speed allowable by the network. This further improves the processing of the primary database itself because it does not have to durably store the redo logs containing the data in the primary and standby as discussed above.

Data block(s) 130 comprise a copy of the data blocks containing the changed data that was loaded onto the primary database 120*a*. In some embodiments, data block 130 may be limited to 1 MB size of data blocks that are changed in the primary database 120*a*. For example, if a data file 110 loaded approximately 1 GB of data into the primary database 120*a*, there may be as many as 1000 data blocks 130, each data block 130 being 1 MB in size, which may correspond to 1000 separate nologging redo records. In some embodiments, data block 130 may contain all of the data blocks associated with an entire data load if the entire data load contains less than 1 MB of data. One of ordinary skill in the art may appreciate that the size of the data block 130 may be configurable. In some embodiments, the 1000 data blocks 130 example may correspond to one placeholder redo record 150 having a block range and SCN equivalent to the block range and SCN of the 1000 data blocks 130 received.

Each data block 130 may comprise metadata that associates the data block 130 to a corresponding nologging redo record 150 so that a standby recovery process 160 may confirm that a respective data block 130 received in memory 125 is associated with a corresponding nologging redo record 150 received via the redo stream 145.

Data block 130 may be received at a memory 125 at the active standby database server 100*b*. Memory 125 is not persistent memory. Instead, memory 125 may be, for example, a cache memory. In some embodiments, memory 125 may be located on the active standby database server 100*b*. In other embodiments, memory 125 may be located on another server accessible by the active standby database server 100*b*. Memory 125 is specifically configured to receive the data blocks 130.

A determination process 155 recognizes when data operations are logged versus when data operations are not being logged by the primary database server 100*b* by inspecting the redo records from the redo stream 145. When data load operations are being logged at the primary database (e.g., logging redo record 140), everything runs as normal because data for the data blocks changed, created or deleted are included in the logging redo record 140. The logging redo record 140 is saved in the redo log database 115*b* and the data blocks containing the data included within the logging redo record 140 are applied to the active standby database 120*b*. However, when data load operations are not being logged (e.g., nologging/placeholder redo record 150) at the primary database, the nologging/placeholder redo record 150 is processed differently.

The standby recovery process 160 checks to see if the nologging/placeholder redo record 150 indicates whether or not data block 130 is sent from the primary database server 100a to the active standby database server 100b. This indicator helps the standby recovery process 160 decide whether or not to search memory 125 for the corresponding data block 130 associated to the nologging/placeholder redo record 150. If the indicator indicates the data block 130 was sent, standby recovery process 160 may search the memory 125 for the data block 130 that corresponds to the nologging redo record 150. Once a match between the data block 130 and the corresponding nologging/placeholder redo record 150 is confirmed, the data block 130 is written/applied to the active standby database 120b. In some embodiments, the determination process 155 may be within the standby recovery process 160. In other embodiments, the determination process 155 may be a separate process from the standby recovery process 160.

Because of the reduced overhead of not having to perform the entire redo logging process, the non-logged operation can be loaded at greater speeds into the primary database 120a and can also be loaded onto the active standby database 120b at greater speeds as well, which ultimately improves the functioning of both databases and/or database servers. For example, as the data block(s) 130 are received in memory at the standby, the data block(s) 130 are written/applied directly to the standby database once a match is confirmed between the placeholder redo record and the corresponding data block(s) 130. This eliminates the need for the data block(s) 130 to be written into at least the redo log 115b.

Figure 2:
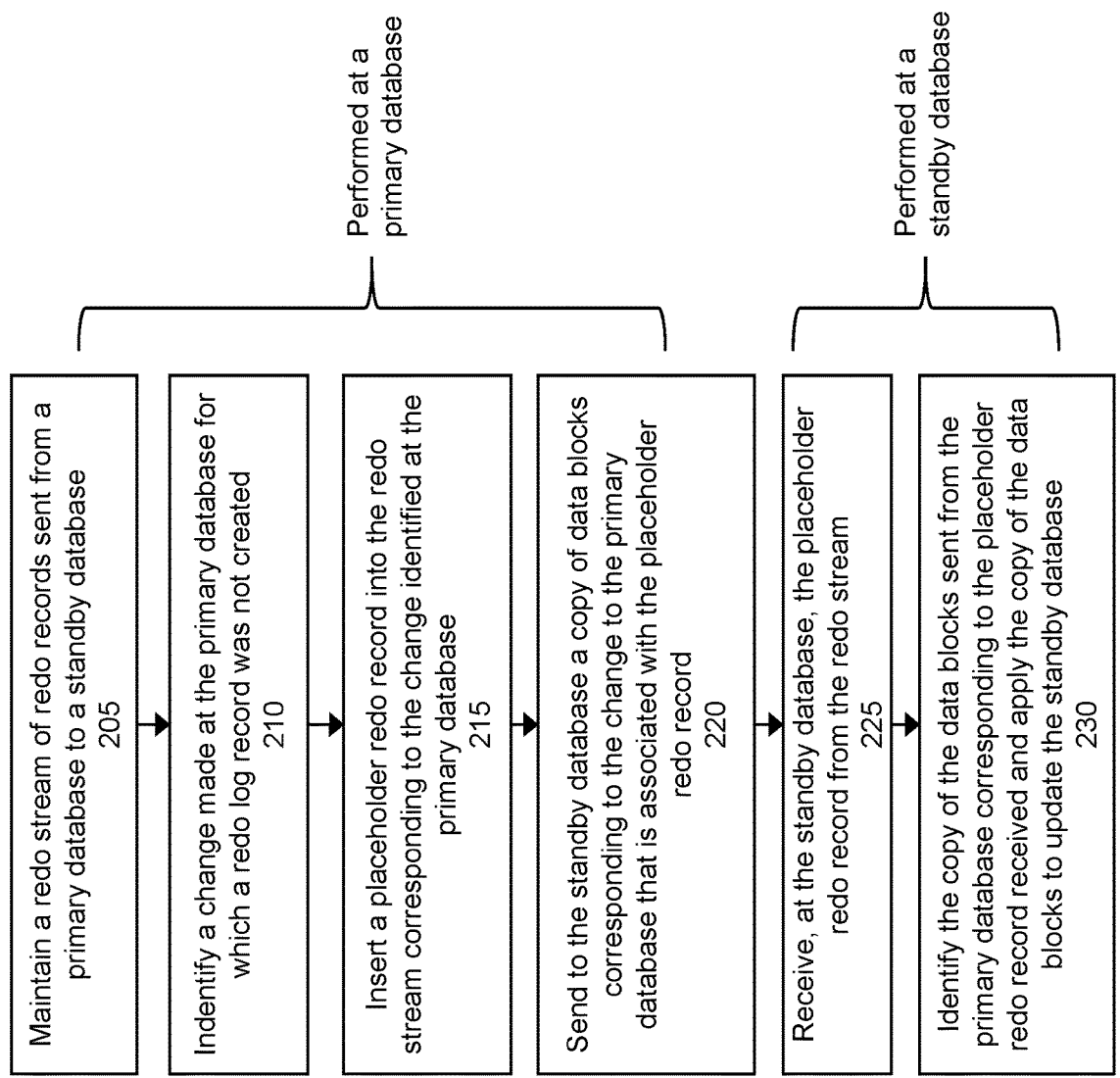
FIG. 2 is a flowchart for an automatic maintenance of standby databases for non-logged workloads, according to some embodiments of the disclosure.

FIG. 2 is a flowchart for an automatic maintenance of standby databases for non-logged workloads according to some embodiments of the disclosure. Some of the steps illustrated in the flowchart are optional in different embodiments. In some embodiments, the steps may be performed in an order different from that described in FIG. 2. Some of the steps of FIG. 2 are discussed below in conjunction with FIG. 3 and FIGS. 4A-4B, which illustrate an example of an automatic maintenance of standby databases for non-logged workloads.

Referring to FIG. 2, in some embodiments, steps 205-220 may be performed at the primary database and steps 225-230 may be performed at the standby database. The flowchart begins when a session 107 performs a data load of data file 110 onto the primary database 120a in the non-logged workload configuration. At 205, a redo stream of redo records sent from the primary database to the standby database is being maintained. At 210, a change made at the primary database for which a redo record was not created is identified. In some embodiments, the change made at the primary database may be an insert of data into one or more database table of the primary database 120a via a direct data loads, bulk data loads, and/or batch data loads with logging turned off. At 215, a placeholder redo record is inserted into the redo stream corresponding to the change identified at the primary database for which the redo record was not created.

At 220, a copy of one or more data blocks corresponding to the change that is associated with the placeholder redo record is sent to the standby database. The copy of the one or more data blocks is sent via a network that is operatively coupled to the primary database and the standby database. The transport mechanism of the copy of data blocks sent via the network is different than from the redo transport mechanism (e.g., the redo stream) that transports the redo records. At 225, the placeholder redo record is received from the redo stream.

At 230, the copy of the one or more data blocks sent from the primary database corresponding to the placeholder redo record received is identified and applied to update the standby database. The copy of data blocks sent from the primary database may be received into a memory at the standby database. The copy of data blocks is then applied to update the standby database upon a confirmation that a successful match has been confirmed between the copy of data blocks received from the primary database and the respective placeholder redo record. In some embodiments, a standby recovery process 160 may perform the identification of the copy of data blocks. In some embodiments, a standby recovery process 160 may apply the copy of data blocks to the standby database.

Figure 3:
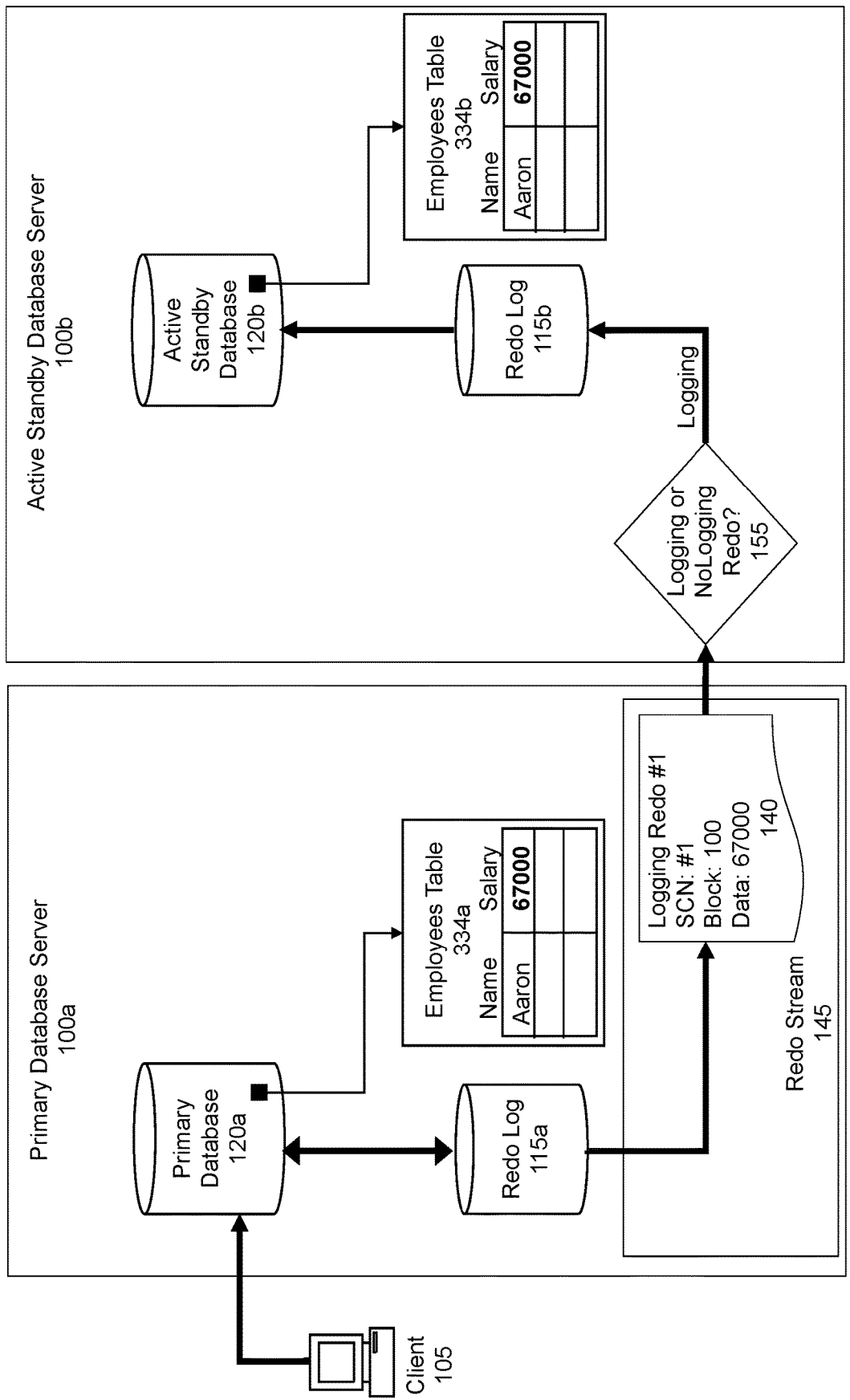
FIG. 3 illustrates an example of a normal logged operation, according to some embodiments of the disclosure.

FIG. 3 illustrates a normal operation entered by a client 105 to demonstrate a typical redo log operation where logging is turned on. With respect to FIG. 3, bold connector lines with arrows indicate a possible flow sequence to demonstrate a typical redo log operation where logging is on, according to some embodiments of the disclosure. As an example, a client 105 updates a record in an Employees table 334a to change an employee's (e.g., Aaron) salary value $67000. The update to the data in the primary database 120a generates a logging redo record 140 into the redo log 115a. The logging redo record 140 is transported to the active standby database server 100b via the redo stream 145.

The logging redo record 140 comprise the data value $67000 stored in data block 100. The logging redo record 140 is received by the active standby database server 100b and a determination process 155 determines whether the redo record is a logging redo or a nologging redo. Since logging redo 140 is a logging redo operation (e.g., logging was on), logging redo 140, including a copy of data block 100 containing at least the changed data is saved to the redo log database 115b and the copy of data block 100 contained within the redo log 140 is written/applied to the active standby database 120b.

Figure 4B:
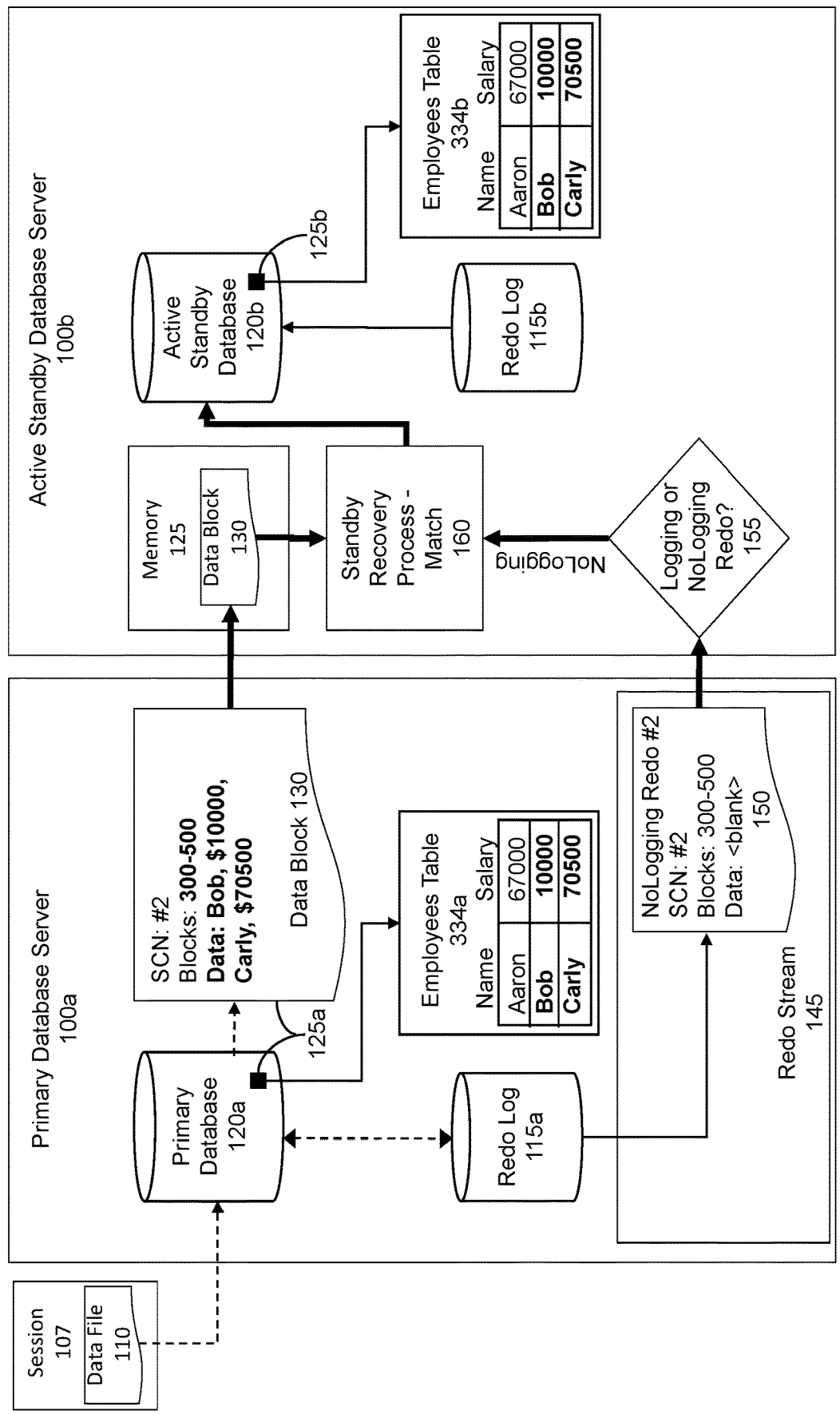

For illustrative purposes, FIGS. 4A-4B illustrate an example of an automatic maintenance of standby databases for non-logged workloads, according to some embodiments of the disclosure. With respect to FIGS. 4A-4B, bold connector lines with arrows indicate a possible flow sequence to automatically maintain a standby database for non-logged workloads, according to some embodiments of the disclosure.

FIG. 4A illustrates an example the non-logged workload processing at the primary database server 100a. Session 107 initiates a non-logged workload process. Session 107 may configure the primary database 120a to load data file 110 into the primary database 120a in a non-logged mode. In this example, two records are loaded into the employees table 334a (e.g., Bob, $10000 and Carly, $70500). This particular data load of data file 110 into the primary database 120a generates a nologging redo record 150 into the redo log database 115a. The nologging redo record 150 is transported to the active standby database server 100b via the redo stream 145. The nologging redo record 150 is generated as a result of the non-logged mode set by session 107 for the data load of data 110. Additionally, data block 130 corresponding to nologging redo record 150 is generated and sent to the active standby database server 100b. Data block 130 is a copy of data block 125a, which includes, for example, the data values of Bob, 10000, Carly, and 70500 for blocks 300-500 and a SCN that corresponds to the SCN within the nologging redo record 150 (e.g., SCN is #2). One of ordinary skill in the art may appreciate the data load of data file 110 may generate one or more redo records and one or more corresponding data blocks 130 depending on the size of the data file 110.

FIG. 4B continues the example from FIG. 4A by illustrating the processing at the active standby database server 100b. Data block 130 is received at a memory 125 location of the active standby database server 100b via a network. The nologging redo record 150 is received by the active standby database server 100b via the redo stream 145. The nologging redo record 150 is received by a determination process 155 that recognizes whether or not the redo record is a logging redo record or a nologging redo record. Since nologging redo record 150 is a nologging redo record (e.g., logging was off) the nologging redo record 150 is sent to the standby recovery process 160 for further processing that is different than that of the normal logging redo logs (e.g., logging redo record 140). The standby recovery process 160 searches the memory 125 for data blocks 130 and matches the redo records 150 with the received data block 130 to confirm data block 130 received at the memory 125 corresponds to the nologging redo records 150. Once standby recovery process 160 confirms the match, the standby recovery process 160 writes/applies the data block 130 to the active standby database 120b. Additionally, the standby recovery process 160 will also write the nologging redo record 150 to the redo log database 115b, wherein the nologging redo record 150 stored in redo log database 115a contains the exact same information as the nologging redo record 150 stored in the redo log database 115b. In some embodiments, an additional redo log corresponding to a logged operation performed at the primary database is received after the nologging/placeholder redo record 150 is processed, wherein the additional redo log comprises data corresponding to data blocks in the primary database. The same redo transport mechanism (e.g., the redo stream) may be used for both the traditional redo records and the placeholder redo records.

The non-logged configuration may be implemented under two modes: "Data Availability" and "Load Performance."

Data Availability Mode

Data Availability mode is a mode of operation, implemented for non-logged workloads, that ensures that data loaded on the primary database will be available at the standby database. If there are any delays in a standby database receiving or applying the data to the standby database, then the primary load process will be held up and the data from the primary load process will not be available to transactions running on the primary until the standby has received and applied the data and sent an acknowledgement back to the primary database. Upon receipt of the acknowledgement, the load process on the primary database will commit its data load. In the Data Availability mode, a standby database should not have missing data as a result of the non-logged workload. However, operating in this mode may cause the load process to be slowed down because the primary database will have to wait for acknowledgement from the standby database before the primary database may commit its data load.

Data Availability mode guarantees full data replication to the standby database. Under normal standby operations, no invalid or missing data blocks should be observed on the standby database at any point in time. This mode ensures the standby database remain synchronized with the primary database during the load. This mode throttles the primary load in the event that the network or the standby cannot sustain the load rate.

Under the Data Availability mode, as long as the standby database is up and running, then the entire direct load will be performed in a non-logged fashion with data block 130 being shipped across network to the active standby database server 100b directly. Commit of the load operations at the primary database 120a waits until an acknowledgement is received from the standby database server 100b that all data shipped to the standby database has been written/applied to the standby data files.

This Data Availability mode guarantees full data replication to the standby database under normal standby operations. In the event of standby database crash or a network disconnect between the primary database and the standby database, subsequent loads may transition to logging automatically. In the event of the standby database or the network is restored, subsequent loads may transition back to non-logged workloads and data block shipping may resume automatically.

The following actions may be taken when the load rate into the primary database 120a is greater than the network bandwidth that can send the data blocks 130, or in the event of a network/standby failure.

Network/Standby Failure: when the network failed or the standby database is down, the load process may log image redo for all data blocks that has not been written to the standby database by standby recovery process (e.g. standby recovery process 160). In other words, the load process may automatically transition to the logging mode and generate logging redo records 140 for all data blocks that have not received acknowledgement that they have been written/applied to the standby database. Some data blocks that have just been sent to the standby may be re-logged again. Re-logging block images guarantees full data replication to the standby database. No image redo (e.g., logging operations) may be logged except for the above failure cases. When the network or the standby database is restored, the load process may automatically transition back to the non-logged workload mode and wait for acknowledgments before committing.

Network Send Blocking: When network bandwidth cannot sustain the load, data sending waits for available network socket buffers, and thus the load is throttled by the network bandwidth. All data blocks are shipped along with the load, which is to guarantee data block version shipped to the standby is the expected version matching the corresponding redo. When waiting for available network socket buffers, data compression may optionally kick in to save Network bandwidth.

In some embodiments, the entire direct load may include a large data file 110 such that each load operation represents only a portion of the data file 110, wherein each acknowledgement received from the active standby database server 100b for each load operation may comprise one or more data blocks 130 being written/applied to the standby database 120b. Thus, the entire direct load may comprise multiple load operations and multiple acknowledgments corresponding to each load operation may be received from the standby database at the primary. Furthermore, since each data block 130 may be 1 MB in size, each acknowledgment may comprise one or more data blocks 130 written/applied to the active standby database 120b. Performance efficiencies may be increased by accumulating one or more data blocks 130 written/applied to the active standby database 120b into an acknowledgement to the primary database server 100a corresponding to each of the multiple load operations.

FIG. 5 is a flow chart for an automatic maintenance of standby databases for non-logged workloads running in a Data Availability mode, according to some embodiments of the disclosure. At 505, a primary database is configured to run a non-logging workload in a data availability mode. At 510, a database session may perform a data load onto the primary database without committing until receiving acknowledgement from the standby database server that the data blocks corresponding to the data load have been written/applied to the standby database. At 515, upon receiving the acknowledgment from the standby database server that the data blocks corresponding to the data load have been written/applied to the standby database, commit the data load in the primary database. At 520, upon not receiving the acknowledgement after waiting for a configurable period of time, the database session may log image redo for all data blocks that have not received acknowledgement that they have been written/applied to the standby database. The logging of image redo for all data blocks generates logging redo records 140, wherein the logging redo records 140 comprise the data blocks having data that is loaded in the primary database and the redo records 140 are transported to the standby database server 100b via the redo stream 145 where the data blocks contained within the redo records 140 are written/applied to the standby database 120b in the normal process of applying logged redo records to the standby database 120b.

Load Performance Mode

Load Performance mode is a mode of operation, implemented under non-logged workloads, that is concerned with not affecting the load performance of the primary database. Load Performance mode is implemented when any impact on the primary database server's load performance cannot be tolerated. Under this mode, the standby database server will not perform immediate modifications after the load on the primary database server is completed. Instead, the standby database server may catch up over time, thus not impacting the load performance on the primary database server in having to throttle back the load process to wait for the standby database server to catch up. Therefore, the standby database server catching up with primary database server is automatic. The Load Performance mode has the least impact on the primary database load operation because under the Load Performance mode, the data loaded onto the primary database may be committed whenever convenient and thus, does not have to wait for an acknowledgment from the standby before committing.

Under the Load Performance mode, data blocks are sent to the standby directly—just as the case under Data Availability mode. However, when the load rate is higher than the network bandwidth, the data load on the primary database is not throttled. Instead, as much data as allowed by network bandwidth will be sent. The remaining data will not be sent to the standby database. The nologging redo logs will indicate that the remaining data was not sent to the standby database server. The standby recovery process may fetch the remaining/missing data from the primary database to apply the remaining/missing data to the standby database in a slightly delayed fashion.

Under Load Performance mode, once data blocks (e.g., data blocks 130) are copied to network socket buffers or nologging redo records are logged, the primary load operation can proceed to commit, without waiting for an acknowledgment from the standby database that the data blocks were written/applied to the standby database.

The entire direct load will be implemented in a non-logged fashion with data shipped across the network to the standby database server directly. The following actions will be taken when the load rate into the primary database is greater than the network bandwidth for sending the data blocks 130 or in the event of a network/standby failure.

Network/Standby Failure: When the network fails or the standby database is unavailable, nologging redo records 150 for the remaining of the load will continue to be generated and transported via the redo stream 145. However, the nologging redo records 150 may indicate that data blocks 130 were not sent to the standby database server 100b. Whereas, the nologging redo records 150 generated under normal operating condition may indicate that data blocks 130 were sent to the standby database server 100b. This indicator within the nologging redo records 150 informs the standby recovery process 160 whether or not to look for the corresponding data blocks 130 in the memory 125 or to just fetch the data corresponding to the data blocks identified within nologging redo records 150 from the primary database 120a. The load operation at the primary database server proceeds to commit after logging the nologging redo records 150 into the redo log database 115a.

Network Send Blocking: When the network bandwidth cannot sustain the load, as much data will be sent to the standby as allowed by network bandwidth. Block images will be automatically fetched from primary database when the standby recovery process (e.g., the standby recovery process 160) encounters the nologging redo records 150 corresponding to those data blocks that were not sent to the standby database server as data blocks 130. The standby recovery process 160 will not attempt to search for the corresponding data block 130 at memory 125. Instead, the standby recovery process 160 may execute a fetch command to fetch a block image from the primary database corresponding to the block or block range as indicated in nologging redo record 150.

It is possible that when the standby recovery process fetches the data blocks on the primary database, the primary database may not be available, may not be open, or has flashbacked to the past, or the data files of the primary database has become offline, or any other conditions that would prevent the standby recovery process from getting the right version of the data blocks (e.g., SCN may be different from what was indicated in the nologging redo log). In all these cases, the standby recovery process will mark the data blocks as "invalid" in the standby database temporarily and remember the range of these data blocks in a control file 170 and re-fetch them at a later point in time. The control file 170 keeps track of a list of contiguous "ranges" of data blocks. This is important to keep ranges of blocks to reduce the size of bookkeeping. In some embodiments, control file 170 is persisted in a non-transitory medium such as a data file so that the control file 170 is not lost even if the standby instance goes down. In some embodiments, the control file 170 is stored on an external server from the standby database server 100b. In any case, if the control file 170 is lost for any reasons, the control file 170 can be reconstructed by re-scanning the whole database on the standby for data blocks marked as "invalid."

Table 1 below depicts the information that is available within the control file 170.

TABLE 1

| Column | Datatype | Description |
| --- | --- | --- |
| FILE# | NUMBER | Absolute file number of the data file that contains the nonlogged blocks |
| BLOCK# | NUMBER | Block number of the first nonlogged block in the range of nologged blocks |
| BLOCKS | NUMBER | Number of nonlogged blocks found starting with BLOCK# |
| NONLOGGING_CHANGE# | NUMBER | The SCN on which this block range was marked as first nonlogged. NULL if unknown. |
| TIME | DATE | The time when the corresponding nologging occurred. NULL if unknown. |
| RESETLOGS_SCN# | NUMBER | The resetlogs change# of the incarnation on which this block range was first marked as nonlogged. NULL if unknown. |
| RESETLOGS_TIME | DATE | The resetlogs time of the incarnation on which this block range was first marked as nonlogged. NULL if unknown. |
| OBJECT# | NUMBER | The object ID this range belongs to. If this field is NULL then it means the object number is unknown. |
| REASON | VARCHAR | The reason why this block range appears in this list; e.g. primary file offline, could not talk to primary, non-standby recovery, etc. |

In some embodiments, the fetching feature is used to atomically resolve invalid blocks on the standby database under the load performance mode. When the standby recovery process encounters nologging redo records 150 caused by the primary not sending the data block(s) 130, the standby recovery process calls a fetch API to connect to the primary database to read those data blocks from disks. The fetch API will send those data blocks back to the standby recovery process. The standby recovery process waits for the API to complete and applies the fetched blocks directly to the standby database. The nologging redo record is considered applied only when the corresponding invalid data blocks are resolved.

The Load Performance mode is designed for applications that do not need immediate modifications at the standby database after the load. In the case that those to-be-fetched data blocks were modified by future operations on the primary database, those data blocks are ahead of the direct write operation, and thus standby recovery cannot directly apply them. Those data blocks will be marked as invalid temporarily in the standby database and these blocks will be fetched later when standby recovery catches up with them.

FIG. 6 is a flow chart for an automatic maintenance of standby databases for non-logged workloads running in a Load Performance mode, according to some embodiments of the disclosure. At 605, a primary database is configured to run a non-logging workload in a load performance mode. At 610, a database session may perform a data load onto the primary database in the non-logging load performance mode. At 615, the copy of the data blocks corresponding to the data loaded onto the primary database is sent to the standby database. At 620, the nologging redo records corresponding to the data load is received at the standby database in memory.

At 630, a standby recovery process may inspect the nologging redo record to determine if a copy of the data blocks corresponding to the nologging redo record was sent. If the copy of the data blocks is indicated as being sent and the copy of the data blocks is retrieved from memory, then at 655, the copy of the data blocks is matched with the corresponding nologging redo record and the copy of the data blocks are written/applied to the standby database.

However, if the copy of the data blocks is indicated as being sent and the copy of the data blocks is not found by the standby recovery process, or if the copy of the data blocks is indicated as not being sent, the flow continues to 635.

At 635, the standby recovery process attempts to fetch from the primary database an image of the missing data blocks as indicated by the nologging redo record.

At 640, if the missing data blocks are not retrieved, the standby recovery process will generate, at 645, an entry into a control file 170 (as shown in FIG. 1). The entry in the control file 170 comprises the missing data blocks and the SCN from the nologging redo record, among other data elements to help the standby recovery process identify the missing data blocks corresponding to the nologging redo record.

The standby recovery process will re-fetch from the primary database the missing data blocks at 635 and will continue to do so until the entry is removed from the control file because of a successful fetch from the primary database or because the entry in the control file is no longer relevant because the actual data blocks in the standby database have been successfully updated to a newer version of the data blocks via the standby recovery process.

However, if the missing data blocks are successfully retrieved at 640, the data blocks are written/applied to the standby database at 650. Successfully retrieval of data blocks comprises receipt of the missing data blocks from the primary database such that the data blocks have the same version (e.g., the same SCN). If the SCN numbers do not match (e.g., the fetched data blocks have an SCN that is later in time than the SCN indicated in the nologging redo record), the data blocks will be re-fetched. A future re-fetch would eventually succeed if the data blocks do not keep changing in on the primary database. This is because the redo recovery process will update the SCN in the control file (e.g., the expected version of the fetch) when the redo recovery process encounters subsequent redo records that reflect changes to the data blocks.

Figure 7A:
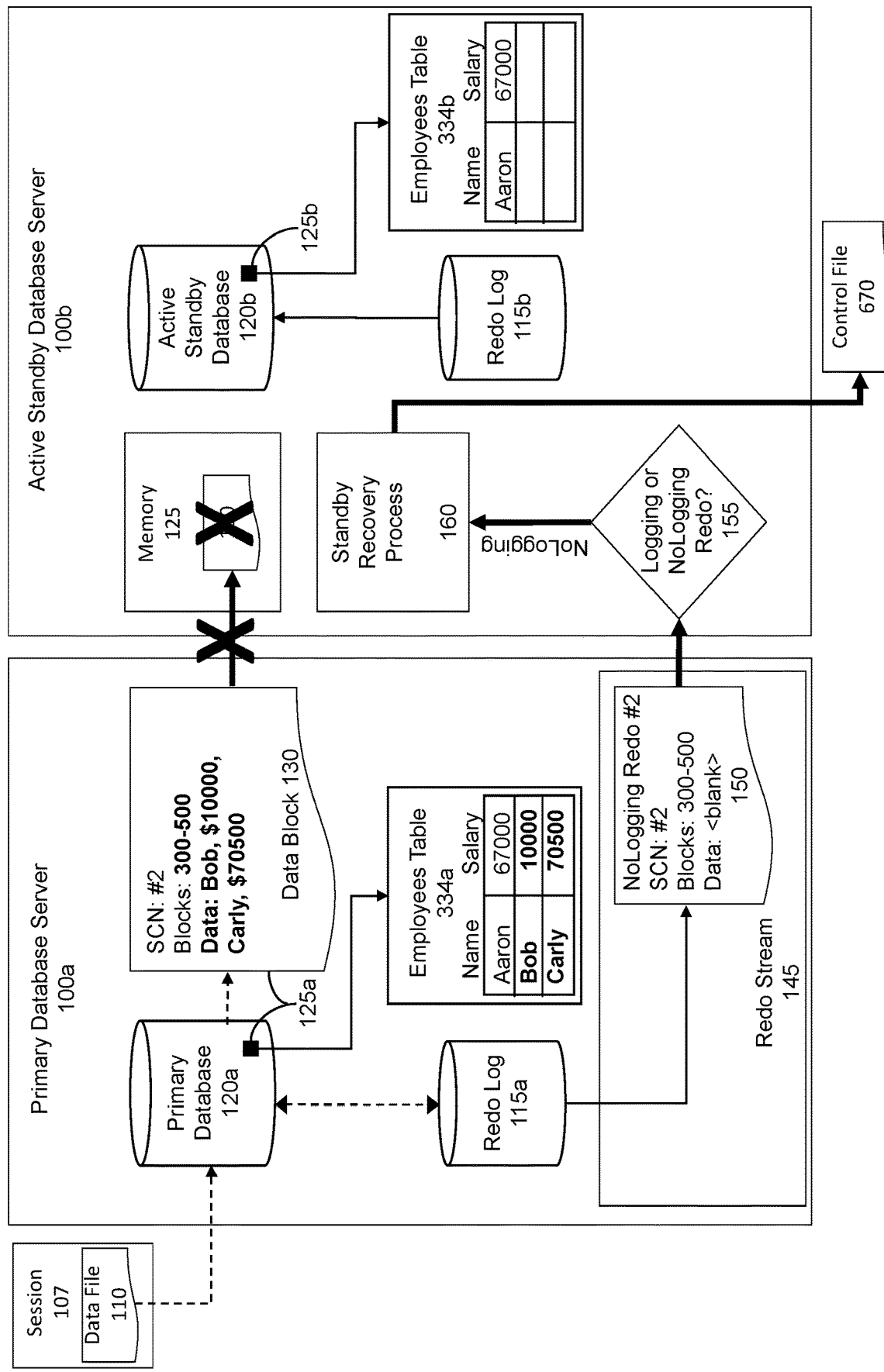
FIG. 7A-7B illustrates an example of an automatic maintenance of standby databases for non-logged workloads running in a Load Performance mode, according to some embodiments of the disclosure.
Figure 7B:
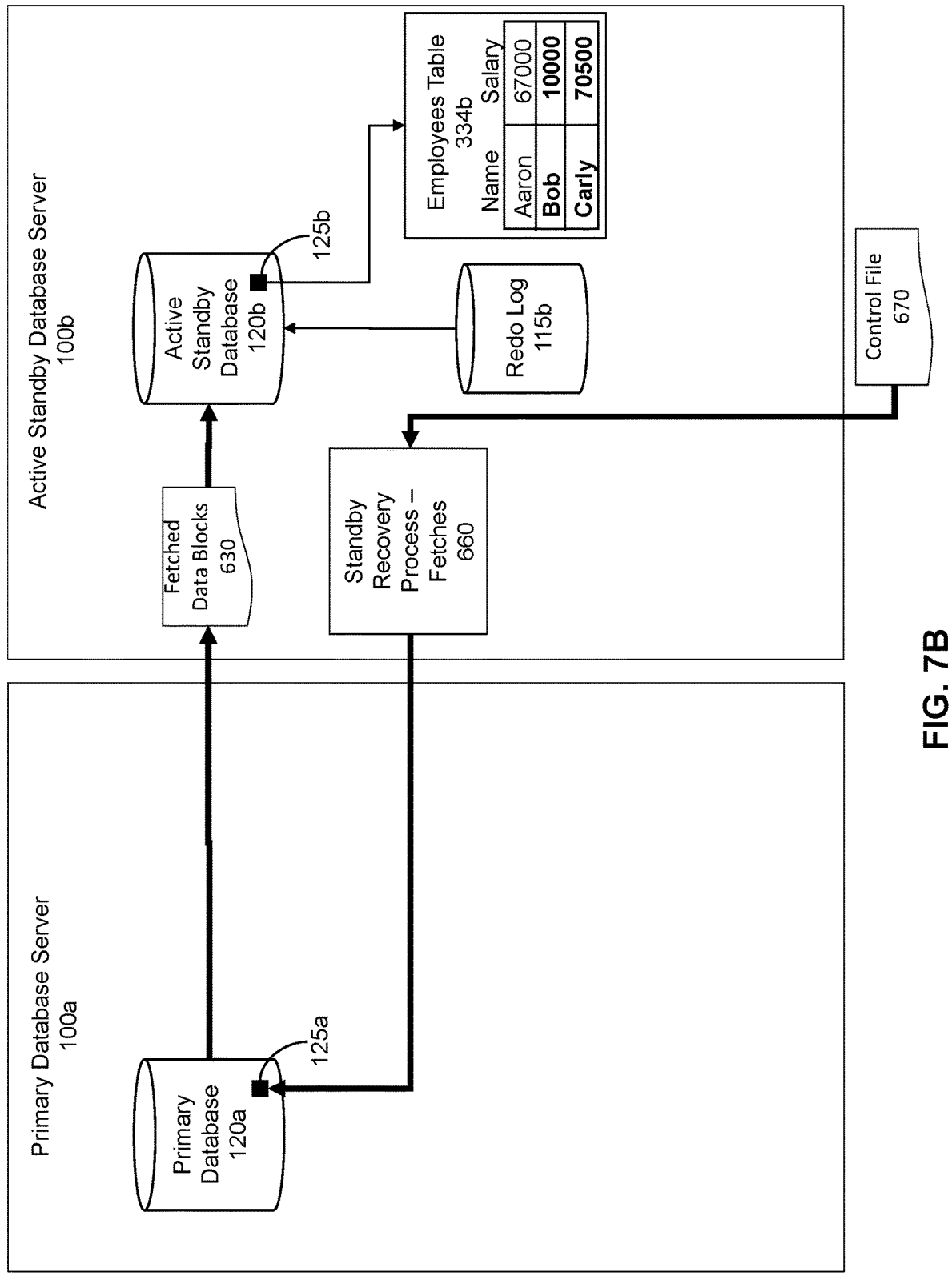

FIG. 7A-7B illustrate an example of an automatic maintenance of standby databases for non-logged workloads running in a Load Performance mode, according to some embodiments of the disclosure. With respect to FIGS. 7A-7B, bold connector lines with arrows indicate a possible flow sequence to automatically maintain a standby database for non-logged workloads running in a Load Performance mode, according to some embodiments of the disclosure.

Under the non-logging load performance mode, there may be situations when data block 130 is not available at the active standby database server 100b when the nologging redo record 150 is received and processed by the standby recovery process 160. This may occur based on various situations such as, for example, the network failing while transferring data block 130 from the primary database server 100a to the active standby database server 100b, in which case, data block 130 is not available at the active standby database server 100b when the standby recovery process 160 is expecting to retrieve the data block 130 from memory 125.

As another example, data block 130 being transferred may have been corrupted during the transfer, in which case, data block 130 is not available at all on the active standby database server 100b. In some embodiments, the nologging redo record 150 may indicate that the primary database server 100a did not send data block 130 corresponding to the nologging redo record 150, in which case, the standby recovery process 160 may not even attempt to retrieve data block 130 from the memory 125. As it can be seen, there may be many reasons why the standby recovery process 160 cannot find a data block 130 corresponding to a nologging redo record 150 from the memory 125.

When the standby recovery process 160 cannot find a data block 130 corresponding to the nologging redo record 150 or if the nologging redo record 150 indicates data block 130 was not sent from the primary database server, the standby recovery process 160 may generate a control file 670 to keep track of the missing data blocks from nologging redo record 150 that was not processed because its corresponding data block 130 was not available at the time of the match. In one embodiment, control file 670 may be a file having records. In another embodiment, control file 670 may be a database table. Yet in other embodiments, control file 670 may reside in memory. In some embodiments, control file 670 may reside on a separate server—not the active standby database server 100b. In other embodiments, control file 670 may reside on the same active standby database server 100b.

When an entry in the control file 670 is generated to store information of the failed match attempt between the nologging redo record 150 and missing data block 130, the standby recovery process 160 will periodically review the control file 670 and reissue fetch requests to the primary database. As depicted in FIG. 7B, the standby recover process 660 will attempt to retrieve the missing data blocks to correspond to the entry within the control file 670 corresponding to the nologging redo record 150 that was not written/applied to the active standby database 120b.

In some embodiments, the entries within the control file are fetched based on a priority. The priority may comprise a hot list and a cold list of entries. New entries written into the control file are immediately placed on the hot list. Entries within the hotlist will be re-fetched within a frequent period of time (e.g., within every 10 seconds) for a number of times (e.g., 5 times). If the fetch fails after, for example, 5 times, the entry is moved to the cold list. Entries within the cold list may be re-fetched within a less frequent time period (e.g., within every 30 minutes). One of ordinary skill in the art may appreciate the period of time and the number of times an entry is re-fetched may be configurable.

When the fetch returns the data blocks 630, the standby recovery process 160 will compare the fetched data blocks' SCN with the SCN of the data blocks in the active standby database 120b to determine if the two SCN matches. If a match is established, then the standby recovery process 160 writes/applies the data blocks to the active standby database 120b and removes the entry from the control file.

What has been disclosed is an improved for automatic maintenance of standby databases for non-logged workloads. This improved approach allows the advantages of both standby databases and non-logged workloads to be used at the same time without incurring any additional administrative/computer processing burden or down time for either the primary database or the one or more standby databases. This improved approach further improves the functioning of the primary database server itself by reducing the amount of disk space and computing processing resources associated with fully logging image redo for data loads. Additionally, by not having to fully log the image redo for the data load, the performance of the actual data load into the primary database is further improved.

System Architecture

Figure 8:
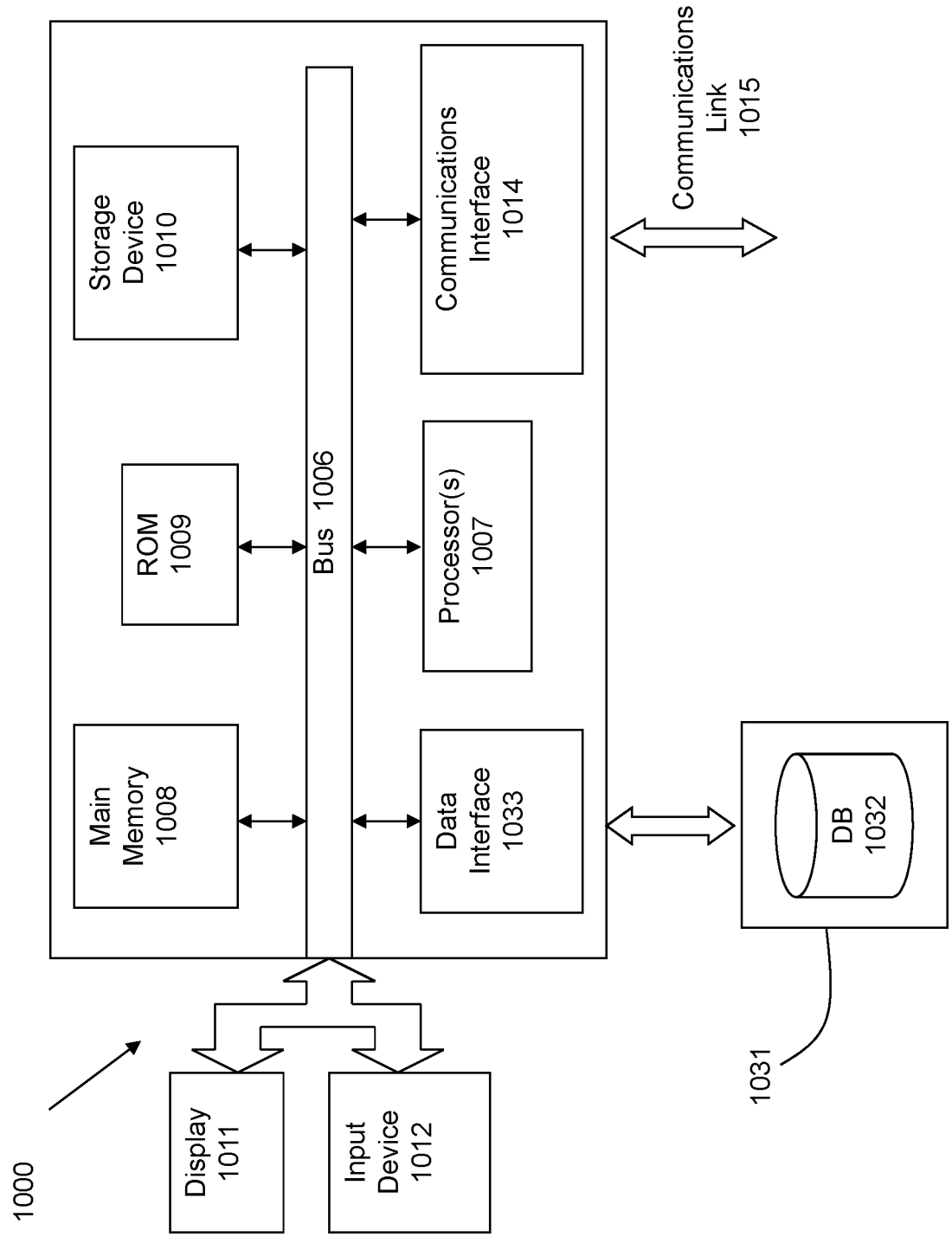
FIG. 8 is a block diagram of a computing system suitable for implementing an embodiment of the present disclosure.

FIG. 8 is a block diagram of an illustrative computing system 1000 suitable for implementing an embodiment of the present disclosure. Computer system 1000 includes a bus 1006 or other communication mechanism for communicating information, which interconnects subsystems and devices, such as processor 1007, system memory 1008 (e.g., RAM), static storage device 1009 (e.g., ROM), disk drive 1010 (e.g., magnetic or optical), communication interface 1014 (e.g., modem or Ethernet card), display 1011 (e.g., CRT or LCD), input device 1012 (e.g., keyboard), data interface 1033, and cursor control.

According to some embodiments of the disclosure, computer system 1000 performs specific operations by processor 1007 executing one or more sequences of one or more instructions contained in system memory 1008. Such instructions may be read into system memory 1008 from another computer readable/usable medium, such as static storage device 1009 or disk drive 1010. In alternative embodiments, hard-wired circuitry may be used in place of or in combination with software instructions to implement the disclosure. Thus, embodiments of the disclosure are not limited to any specific combination of hardware circuitry and/or software. In some embodiments, the term "logic" shall mean any combination of software or hardware that is used to implement all or part of the disclosure.

The term "computer readable medium" or "computer usable medium" as used herein refers to any medium that participates in providing instructions to processor 1007 for execution. Such a medium may take many forms, including but not limited to, non-volatile media and volatile media. Non-volatile media includes, for example, optical or magnetic disks, such as disk drive 1010. Volatile media includes dynamic memory, such as system memory 1008.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the disclosure, execution of the sequences of instructions to practice the disclosure is performed by a single computer system 1000. According to other embodiments of the disclosure, two or more computer systems 1000 coupled by communication link 1010 (e.g., LAN, PTSN, or wireless network) may perform the sequence of instructions required to practice the disclosure in coordination with one another.

Computer system 1000 may transmit and receive messages, data, and instructions, including program, e.g., application code, through communication link 1015 and communication interface 1014. Received program code may be executed by processor 1007 as it is received, and/or stored in disk drive 1010, or other non-volatile storage for later execution. A database 1032 in a storage medium 1031 may be used to store data accessible by the system 1000 via data interface 1033.

Figure 9:
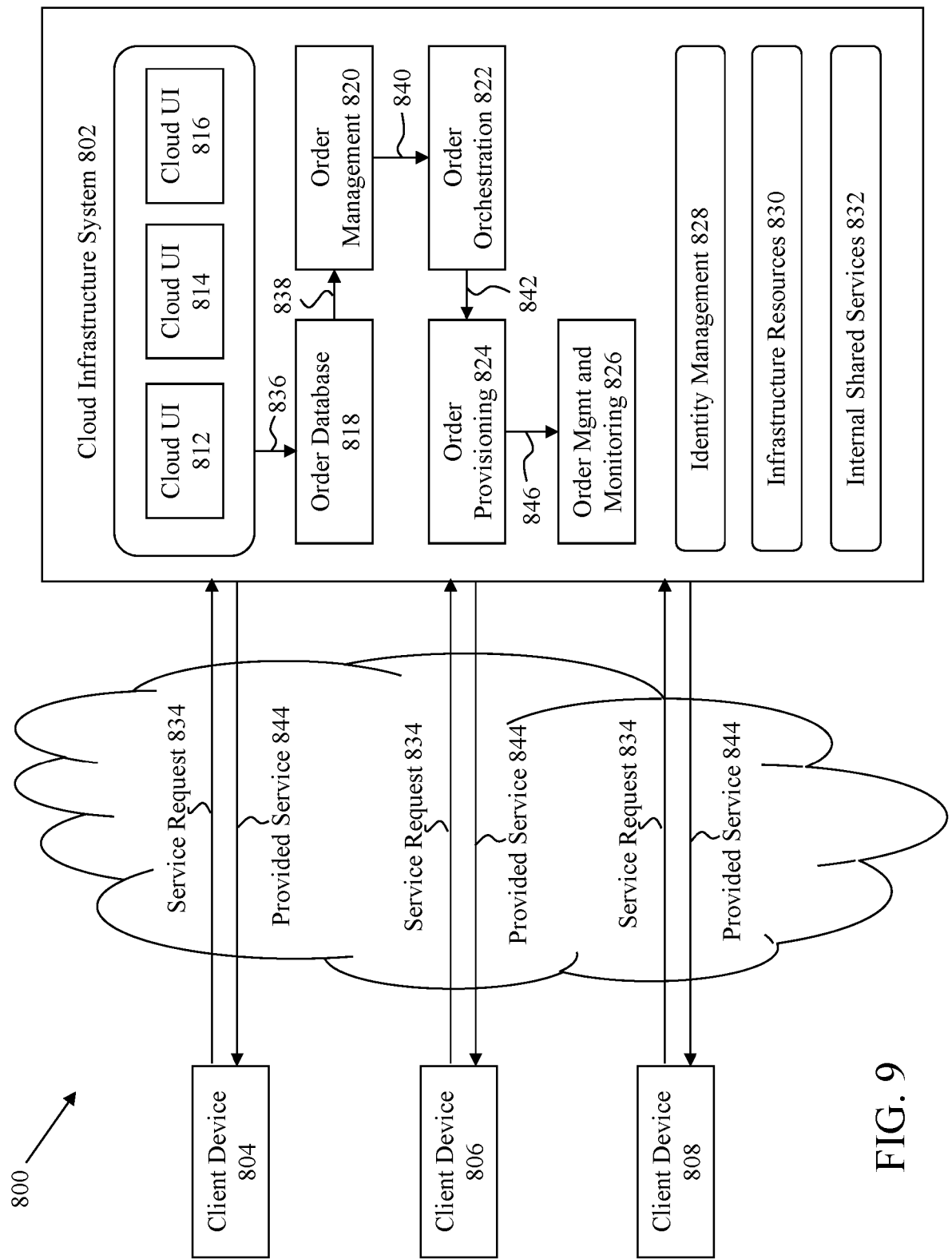
FIG. 9 is a simplified block diagram of one or more components of a system environment 800 by which services provided by one or more components of an embodiment system may be offered as cloud services, in accordance with an embodiment of the present disclosure.

FIG. 9 is a simplified block diagram of one or more components of a system environment 800 by which services provided by one or more components of an embodiment system may be offered as cloud services, in accordance with an embodiment of the present disclosure. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application, or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the embodiment shown in the figure is only one example of a cloud infrastructure system that may incorporate an embodiment of the disclosure. In some other embodiments, cloud infrastructure system 802 may have more or fewer components than shown in the figure, may combine two or more components, or may have a different configuration or arrangement of components.

Client computing devices 804, 806, and 808 may be devices similar to those described above for FIG. 8. Although system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols. Cloud infrastructure system 802 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner.

In various embodiments, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that allow organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that allow organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 830 may allow a first set of users in a first time zone to utilize resources of the cloud infrastructure system for a specified number of hours and then allow the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In operation 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816. At operation 836, the order is stored in order database 818. Order database 818 can be one of several databases operated by cloud infrastructure system 818 and operated in conjunction with other system elements. At operation 838, the order information is forwarded to an order management module 820. In some instances, order management module 820 may be configured to perform billing and accounting functions related to the order, such as verifying the order, and upon verification, booking the order. At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 allows the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 allows the allocation of resources for the services ordered by the customer. Order provisioning module 824 provides a level of abstraction between the cloud services provided by cloud infrastructure system 802 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 802 may include an identity management module 828. Identity management module 828 may be configured to provide identity services, such as access management and authorization services in cloud infrastructure system 802. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

What is claimed is:

1. A computer implemented method for automatic maintenance of standby databases for a non-logged workload, the method comprising:
    at a primary database, performing a first set of acts without creating a redo record in the redo log for a change made by a non-logged workload to a primary database, the first set of acts comprising:
        maintaining a redo stream of redo records to be sent from the primary database to a standby database;
        identifying the change made at the primary database for which the redo record was not created;
        inserting a placeholder redo record into the redo stream corresponding to the change identified at the primary database; and
        sending, to the standby database, the placeholder redo record and a set of data blocks; and sending the placeholder record and the set of data blocks to the standby database, wherein a second set of acts is performed without creating the redo record for the change in the redo log, the second set of acts comprising:
        sending, from the primary database to the standby database, the placeholder redo record in the redo stream and the set of data blocks, wherein
            in response to receipt of the placeholder redo record, one or more data blocks are identified from the set of data blocks, which has been sent by the primary database, at least by analyzing the placeholder redo record,
            the placeholder redo record comprises information that links the placeholder redo record for the change to the one or more data blocks, and
            the one or more data blocks being sent to the standby database are applied to update the standby database with the change for which the redo record has not been created in the redo log.

2. The computer implemented method of claim 1, wherein the placeholder redo record does not contain the one or more data blocks that were changed in the primary database by the non-logged workload as a logging mechanism for logging the change into the redo log is turned off prior to execution of the non-logged workload.

3. The computer implemented method of claim 1, wherein the one or more data blocks comprise data corresponding to first data loaded in the primary database.

4. The computer implemented method of claim 1, the first set of acts further comprising receiving an additional redo record corresponding to a fully logged operation performed at the primary database, wherein the additional redo record is created in the redo log for an additional change made by the fully logged operation to the primary database.

5. The computer implemented method of claim 4, wherein the additional redo record comprises the additional change corresponding to one or more additional data blocks that were changed in the primary database.

6. The computer implemented method of claim 1, wherein a data load operation from the non-logged workload in the primary database waits to commit until an acknowledgement is received from the standby database that the one or more data blocks corresponding to the data load operation have been applied to the standby database.

7. The computer implemented method of claim 6, further comprising the non-logged workload programmatically transitioning to a logging workload when the standby database is unavailable or when a network connection between the standby database and the primary database is disconnected.

8. The computer implemented method of claim 7, further comprising the logging workload programmatically transitioning back to the non-logged workload when the standby database is restored or when the network connection between the standby database and the primary database is restored.

9. The computer implemented method of claim 1, wherein the change is committed once the one or more data blocks are sent to the standby database without waiting for an acknowledgment from the standby database.

10. The computer implemented method of claim 9, wherein the standby database is synchronized with the primary database by applying at least the one or more data blocks to the standby database.

11. The computer implemented method of claim 9, wherein a control file is generated when the one or more data blocks corresponding to the placeholder redo record at the standby database are not received at the standby database.

12. The computer implemented method of claim 11, wherein the control file comprises one or more missing data blocks information and a system change number (SCN) identified from the placeholder redo record, wherein the one or more missing data blocks information pertains to the one or more data blocks corresponding to the change.

13. The computer implemented method of claim 12, wherein the one or more missing data blocks information in the control file is fetched from the primary database and applied to update the standby database.

14. A system for automatic maintenance of standby databases for non-logged workloads, comprising:
 a processor; and
 a memory to hold program code instructions, in which the program code instructions comprise program code to perform a set of acts, the set of acts comprising:
  at a primary database, performing a first set of acts without creating a redo record in the redo log for a change made by a non-logged workload to a primary database, the first set of acts comprising:
   maintaining a redo stream of redo records to be sent from the primary database to a standby database;
   identifying the change made at the primary database for which the redo record was not created;
   inserting a placeholder redo record into the redo stream corresponding to the change identified at the primary database; and
   sending, to the standby database, the placeholder redo record and a set of data blocks; and
  sending the placeholder record and the set of data blocks to the standby database, wherein a second set of acts is performed without creating the redo record for the change in the redo log, the second set of acts comprising:
   sending, from the primary database to the standby database, the placeholder redo record in the redo stream and the set of data blocks, wherein
    in response to receipt of the placeholder redo record, one or more data blocks are identified from the set of data blocks, which has been sent by the primary database, at least by analyzing the placeholder redo record,
    the placeholder redo record comprises information that links the placeholder redo record for the change to the one or more data blocks, and
    the one or more data blocks being sent to the standby database are applied to update the standby database with the change for which the redo record has not been created in the redo log.

15. The system of claim 14, wherein the placeholder redo record does not contain the one or more data blocks that were changed in the primary database by the non-logged workload as a logging mechanism for logging the change into the redo log is turned off prior to execution of the non-logged workload.

16. The system of claim 14, wherein the one or more data blocks comprise data corresponding to first data loaded in the primary database.

17. The system of claim 14, wherein the program code instructions for the first set of acts further comprise program code to perform receiving an additional redo record corresponding to a fully logged operation performed at the primary database, wherein the additional redo record is created in the redo log for an additional change made by the fully logged operation to the primary database.

18. The system of claim 17, wherein the additional redo record comprises the additional change corresponding to one or more first data blocks that were changed in the primary database.

19. The system of claim 14, wherein a data load operation from the non-logged workload in the primary database waits to commit until an acknowledgement is received from the standby database that the one or more data blocks corresponding to the data load operation have been applied to the standby database.

20. The system of claim 19, wherein the program code instructions further comprise program code to perform the non-logged workload programmatically transitioning to a logging workload when the standby database is unavailable or when a network connection between the standby database and the primary database is disconnected.

21. The system of claim 20, wherein the program code instructions further comprise program code to perform the logging workload programmatically transitioning back to the non-logged workload when the standby database is restored or when the network connection between the standby database and the primary database is restored.

22. The system of claim 14, wherein the change is committed once the one or more data blocks are sent to the standby database without waiting for an acknowledgment from the standby database.

23. The system of claim 22, wherein the standby database is synchronized with the primary database by applying the one or more data blocks to the standby database.

24. The system of claim 22, wherein a control file is generated when the one or more data blocks corresponding to the placeholder redo record at the standby database are not received at the standby database.

25. The system of claim 24, wherein the control file comprises missing data blocks information and a system change number (SCN) identified from the placeholder redo record, wherein the one or more missing data blocks information pertains to the one or more data blocks corresponding to the change.

26. The system of claim 25, wherein the missing data blocks information in the control file is fetched from the primary database and applied to update the standby database.

27. A computer program product including a non-transitory computer readable medium having instructions which, when executed by a processor, causes the processor to perform a process for automatic maintenance of standby databases for non-logged workloads, the process comprising:
 at a primary database, performing a first set of acts without creating a redo record in the redo log for a change made by a non-logged workload to a primary database, the first set of acts comprising:
  maintaining a redo stream of redo records to be sent from the primary database to a standby database;
  identifying the change made at the primary database for which the redo record was not created;
  inserting a placeholder redo record into the redo stream corresponding to the change identified at the primary database; and
  sending, to the standby database, the placeholder redo record and a set of data blocks; and
 sending the placeholder and the set of data blocks to the standby database, wherein a second set of acts is performed without creating the redo record for the change in the redo log, the second set of acts comprising:

sending, from the primary database to the standby database, the placeholder redo record in the redo stream and the set of data blocks, wherein in response to receipt of the placeholder redo record, the one or more data blocks are identified from the set of data blocks, which has been sent by the primary database, at least by analyzing the placeholder redo record, the placeholder redo record comprises information that links the placeholder redo record for the change to the one or more data blocks and the one or more data blocks being sent to the standby database are applied to update the standby database with the change for which the redo record has not been created in the redo log.

28. The computer program product of claim 27, wherein the placeholder redo record does not contain the one or more data blocks that were changed in the primary database by the non-logged workload as a logging mechanism for logging the change into the redo log is turned off prior to execution of the non-logged workload.

29. The computer program product of claim 27, wherein the one or more data blocks comprise data corresponding to first data loaded in the primary database.

30. The computer program product of claim 27, wherein the first set of acts further comprises receiving an additional redo record corresponding to a fully logged operation performed at the primary database, wherein the additional redo record is created in the redo log for an additional change made by the fully logged operation to the primary database.

31. The computer program product of claim 30, wherein the additional redo record comprises the additional change corresponding to one or more first data blocks that were changed in the primary database.

32. The computer program product of claim 27, wherein a data load operation from the non-logged workload in the primary database waits to commit until an acknowledgement is received from the standby database that the one or more data blocks corresponding to the data load operation have been applied to the standby database.

33. The computer program product of claim 32, wherein the process further comprises the non-logged workload programmatically transitioning to a logging workload when the standby database is unavailable or when a network connection between the standby database and the primary database is disconnected.

34. The computer program product of claim 33, wherein the process further comprises the logging workload programmatically transitioning back to the non-logged workload when the standby database is restored or when the network connection between the standby database and the primary database is restored.

35. The computer program product of claim 27, wherein the change is committed once the one or more data blocks are sent to the standby database without waiting for an acknowledgment from the standby database.

36. The computer program product of claim 35, wherein the standby database is synchronized with the primary database by applying at least the one or more data blocks to the standby database.

37. The computer program product of claim 35, wherein a control file is generated when the one or more data blocks corresponding to the placeholder redo record at the standby database are not received at the standby database.

38. The computer program product of claim 37, wherein the control file comprises one or more missing data blocks information and a system change number (SCN) identified from the placeholder redo record, wherein the one or more missing data blocks information pertains to the one or more data blocks corresponding to the change.

39. The computer program product of claim 38, wherein the one or more missing data blocks information in the control file is fetched from the primary database and applied to update the standby database.

40. A computer implemented method for automatic maintenance of standby databases for non-logged workloads, the method comprising:

at a primary database, synchronizing a change made by a non-logged workload to the primary database to a standby database without creating a redo record for a change in a redo log at least by performing a set of acts, the set of acts comprising:

maintaining a redo stream of redo records that is sent from the primary database to a standby database;

identifying the change made at the primary database for which a redo record is not created in the redo log;

inserting a placeholder redo record into the redo stream corresponding to the change identified at the primary database; and sending, to the standby database, the placeholder redo record and a set of data blocks corresponding to the change that is associated with the placeholder redo record, wherein in response to receipt of the placeholder redo record, the standby database identifies one or more data blocks from the set of data blocks that has been sent by the primary database, the placeholder redo record is analyzed to identify one or more data blocks from the set of data blocks, and the placeholder redo record comprises information that links the placeholder redo record for the change to the one or more data blocks.

* * * * *

UNITED STATES PATENT AND TRADEMARK OFFICE
CERTIFICATE OF CORRECTION

PATENT NO. : 11,010,267 B2  
APPLICATION NO. : 15/828146  
DATED : May 18, 2021  
INVENTOR(S) : Neall et al.

Page 1 of 1

It is certified that error appears in the above-identified patent and that said Letters Patent is hereby corrected as shown below:

In the Drawings

On sheet 2 of 11, in FIG. 2, under Reference Numeral 210, Line 1, delete "Indentify" and insert -- Identify --, therefor.

In the Claims

In Column 27, Line 8, in Claim 27, before "one" delete "the".

Signed and Sealed this
Twenty-fourth Day of August, 2021

Drew Hirshfeld
*Performing the Functions and Duties of the
Under Secretary of Commerce for Intellectual Property and
Director of the United States Patent and Trademark Office*